(No Model.)

A. B. FISHER.
Machine for Shaving Basket Splints.

No. 234,398. Patented Nov. 16, 1880.

Witnesses.
A. W. Wilcox
Chas. D. Gay

Inventor.
Alvan B. Fisher
By Chas. H. Burleigh
Atty.

N. PETERS, PHOTO-LITHOGRAPHER, WASHINGTON, D. C.

UNITED STATES PATENT OFFICE.

ALVAN B. FISHER, OF WEST RUTLAND, MASSACHUSETTS.

MACHINE FOR SHAVING BASKET-SPLINTS.

SPECIFICATION forming part of Letters Patent No. 234,398, dated November 16, 1880.

Application filed August 16, 1880. (No model.)

*To all whom it may concern:*

Be it known that I, ALVAN B. FISHER, of West Rutland, in the county of Worcester and State of Massachusetts, have invented certain new and useful Improvements in Machines for Shaving Basket-Splints; and I declare the following to be a description of my said invention sufficiently full, clear, and exact to enable others skilled in the art to which it appertains to make and use the same, reference being had to the accompanying drawings, which form a part of this specification.

My invention relates to improvements in that class of machines which are employed for shaving and preparing the thin pieces or strips of wood from which baskets are constructed, and in which the thin stock is, by suitable drawing or feeding devices, passed between the guides and shaving-blades for simultaneously smoothing both sides of the piece.

The objects of my invention are to provide positive adjusting mechanism conveniently under control of the attendant, and to render the knife-carriers, cutting-blades, and guides laterally adjustable to any desired thickness of stock, and capable of such adjustment without variation in the angle or position at which the cutters are presented in relation to the work; also, to afford facilities whereby the cutting devices may be automatically governed to effect the tapering of the stock; to provide a drawing mechanism capable of retaining sure hold upon the material while ready and convenient for operation, and to perfect and adapt the parts of the machine to perform their respective functions in a practical and satisfactory manner. I attain these objects by mechanism substantially such as shown in the accompanying drawings, and hereinafter described, the subject-matter claimed being definitely specified.

Figure 1:
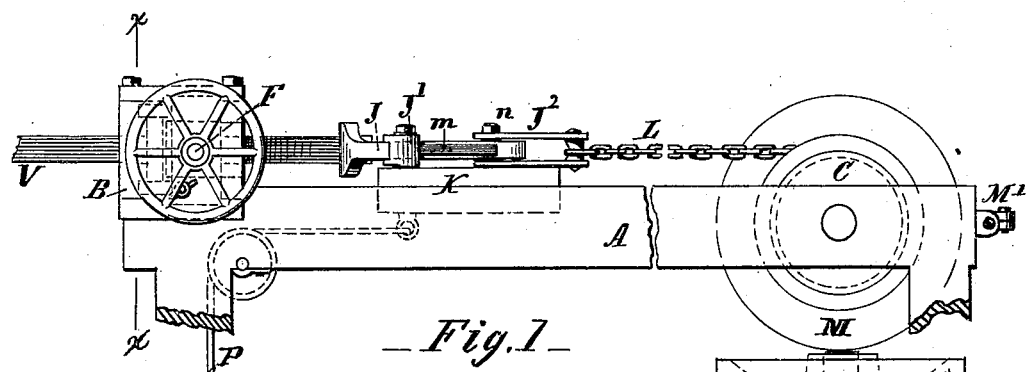
Figure 2:
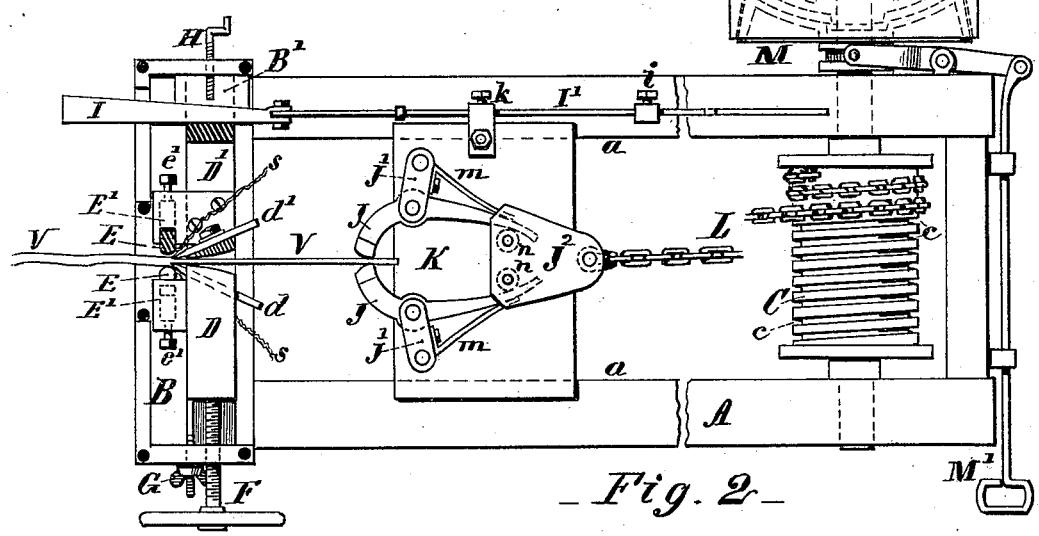
Figures 3, 4:
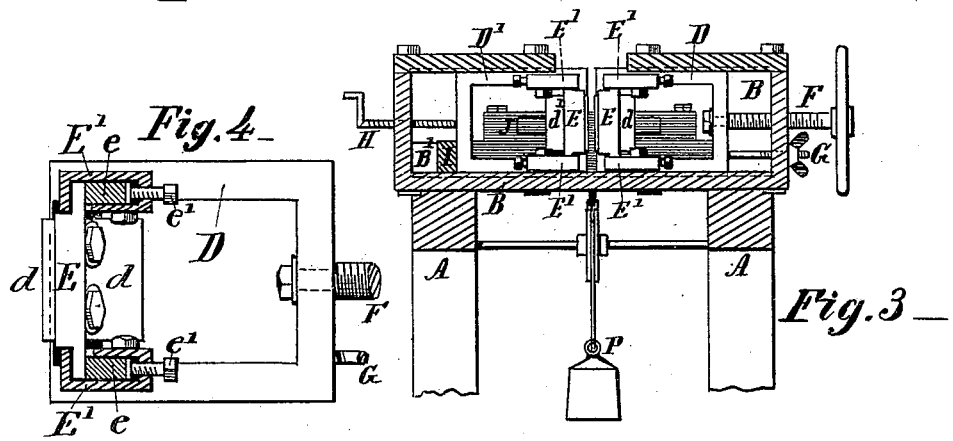

In the drawings, Figure 1 is a side view of my improved machine for preparing basket-stock. Fig. 2 is a plan view of the same, with the cap-plate of the head removed and one of the carriers shown in section. Fig. 3 is a transverse section at line $x\ x$, Fig. 1, showing the front of the carriers, guides, &c.; and Fig. 4 is a front view of one of the carriers, with the guide devices shown in section.

A denotes the main frame, of sufficient length for the stock, with side guides, $a\ a$, for the draft mechanism, and supporting the head-piece B at one end and the winding-drum C at the other.

D D' indicate knife holders or carriers, consisting of open rectangular pieces mounted to slide in grooves or on guideways in the head B, and movable in a lateral direction or toward and from each other in a direction at right angle, or nearly so, to the direction in which the stock V moves.

$d\ d'$ indicate the cutters or knife-blades, secured to the inner inclined ends of the carriers D D', respectively, and standing at the proper angles to cut or shave the stock in the desired manner.

E indicates the guides in front of the cutters $d$, for directing the piece and causing the mechanism to work with or to follow the grain of the wood. Said guides consist of vertical metal bars with rounded faces, and having their ends supported in boxes E', which are fixed on the carriers D, (see Figs. 3 and 4,) and provided with rubber or other springs, $e$, as shown, which permit independent depression at either end of the bar E.

The tension of the springs $e$ may be regulated by the screws $e'$.

The guides E may be set toward or from the blades $d$ by moving the boxes E' on the carriers D.

F indicates a screw and hand-wheel for moving the carrier D back and forth, and adjusting the position of the cutters for working different thicknesses of stock. Said screw F is swiveled to the carrier and screw-threaded to the head-piece B.

G indicates a sliding bolt fixed to the carrier D and movable through the head-piece B, and provided with a thumb-nut, that serves as an adjustable stop for gaging the inward movement of the carrier D and knife $d$.

H indicates a screw, which may be used as a stop or adjustment for the carrier D'.

I indicates a sliding pattern or wedge inserted back of the carrier D', and connected for operation with the drawing-head K, for pressing forward said carrier D' and effecting a tapering cut on the stock.

B' is an inclined bearing-block, which forms a seat for the wedge I.

In the present instance the taper devices are connected by a rod, I', that passes through an ear, $k$, on the draw-plate K, and is fitted with an adjustable stop-collar, $i$, as illustrated, Other means of connection could be employed, if preferred, to effect the operation of the part I from the draft or feeding devices.

The clamp devices for holding and drawing forward the stock through the cutters I construct in the manner shown. Two curved jaws, J, are fulcrumed to the inner ends of short swinging arms J', which have their opposite ends pivoted to the head or plate K, and a straining-plate, J², with studs or rolls n, working between the jaw-levers J, forms the connecting-link between the clamping devices and draft-chain L. Springs m may be secured to the arms J', as shown, for pressing in the rear ends of the jaw-levers J.

The griping-jaws are forced together by the strain of the draft, wedging the rolls n between the inward-curved rear ends of the jaw-levers J. The force of the gripe increases with the increase of strain on the chain L, and the jaws let go their hold when the strain is relieved.

The winding-drum C is provided with a spiral groove, c, into which the projecting half of the links enter as the chain L is wound onto said drum.

The drawing-head K may be returned to the head B of the machine by a cord and weight, P, or by any suitable device.

M indicates a driving-pulley and clutch, provided with suitable shipper devices, M', for the proper operation of the winding-drum C.

In the operation of the machine the cutters and guides are opened by a turn of the hand-wheel F, the end of the stock V is placed between the jaws J, and the cutters run into place by reverse movement of the hand-wheel F. The drum C being then started, the chain L draws back the head K and pulls the stock through between the cutters d d', which shave it to uniform thickness until the ear k strikes the collar i, and by drawing back the rod I' and wedge I forces inward the carrier D' with a movement corresponding with the pattern of said wedge I, causing the cutter d' to advance and cut a taper on the end of the piece of stock. The knives follow with the grain of the wood, both when cutting parallel and when making the taper, or as nearly therewith as possible. The shavings pass out at the back of the carriers, as at s.

If the stock is thick or uneven in parts, it can be reduced by several shavings, since the operator, by means of the screw F, can readily govern the position of the knives and move them in or out, as required, before reaching the limit determined by the gage-stop G.

The knives being secured to the sliding carriers, which move directly toward or from each other, the adjustment is easily and quickly effected without varying the angularity of the knives as regards the piece of stock V; hence liability of splitting off or severing the stock by the digging in of one of the blades is obviated, and stock of any desired thickness can be shaved without changing the position of the knives or guides on their carriers.

I am aware that machines have heretofore been constructed in which a winding-drum with draft-rope and clamping-tongs were employed for drawing the basket-stock between a pair of shaving-blades supported on swinging knife-holders. Therefore I do not herein make claim, broadly, to such method of operation irrespective of the construction of mechanism.

Neither do I broadly claim the employment of an automatically-advancing shaving-blade in wood-working machinery, as I am aware that the mechanism heretofore patented to J. Crary contains an automatically-actuated cutting device for shaving shingles tapering. Said mechanism, however, is not adapted to the purposes provided for by my present invention.

What I claim as of my invention, and desire to secure by Letters Patent, is—

1. The open rectangular knife-holders D D', supporting cutting-blades d d' and guide-bars E, and mounted to slide in lateral guides on the head-piece B, in combination with the winding-drum C, draft-chain L, and drawing-plate K, provided with clamping devices, as and for the purposes set forth.

2. In a machine for preparing basket-stock, the combination, with the head-piece B, having lateral grooves or guideways, of the knife-supporting carriers D D', with cutting-blades d d' and guide-bars E, arranged as described, the hand-wheel screw F, and gage-bolt or stop G, or its equivalent, substantially as and for the purposes set forth.

3. In a machine for preparing basket-stock, the combination, with the laterally-sliding carrier D', supporting the shaving-blade d', of the pattern or wedge I, connected by rod I', or its equivalent, with the draft-head K, for automatic operation, as and for the purpose set forth.

4. The combination, with the carrier D', head B, and draft-plate K, having ear k, of the wedge I, rod I', and adjustable collar or stop i, as and for the purposes set forth.

5. The combination, with the shaving mechanism, feed draft-plate K, and draft-chain L, in a machine for preparing basket-stock, of the jaw-levers J, the swing-arms J', pivoted on the draft-plate and supporting the fulcrums of said levers, and the strain-plate J², with studs or rolls n, as and for the purposes set forth.

6. The combination, with the carrier D and cutting-blade d, of the boxes E', attached to the upper and lower bars of said carrier, the guide-bar E, having its ends retained within said boxes and supported by the springs e, arranged substantially as shown and described, for the purpose set forth.

Witness my hand this 10th day of August, A. D. 1880.

ALVAN B. FISHER.

Witnesses:
CHAS. H. BURLEIGH,
A. J. PEIRSE.